April 24, 1928.
J. W. TEWSLEY
WEAR COMPENSATING PIN
Filed April 12, 1927
1,667,610
2 Sheets-Sheet 1
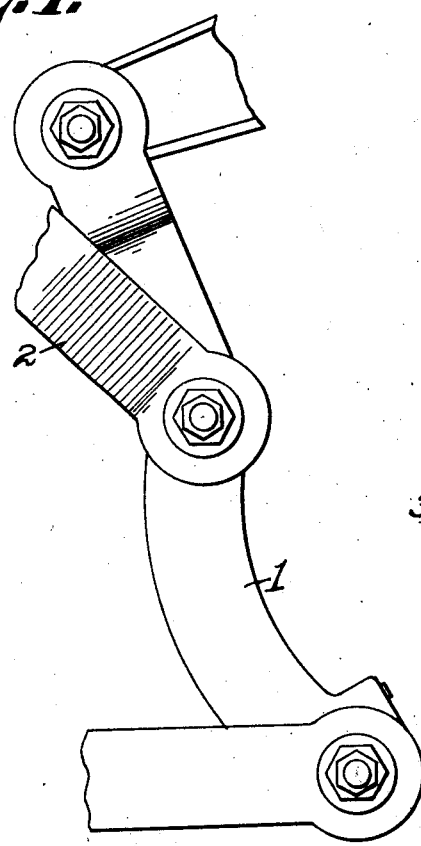
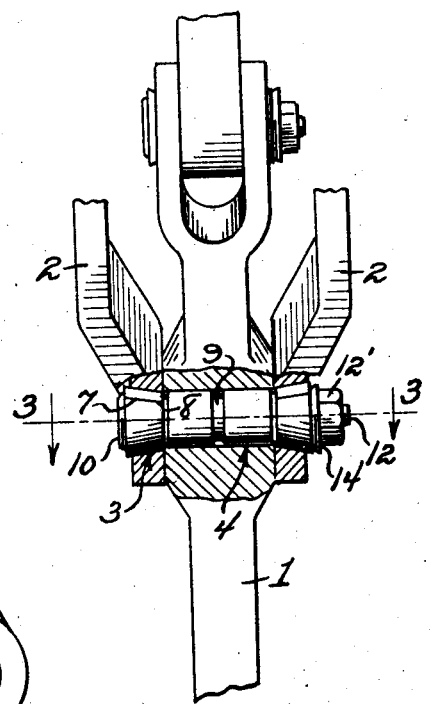
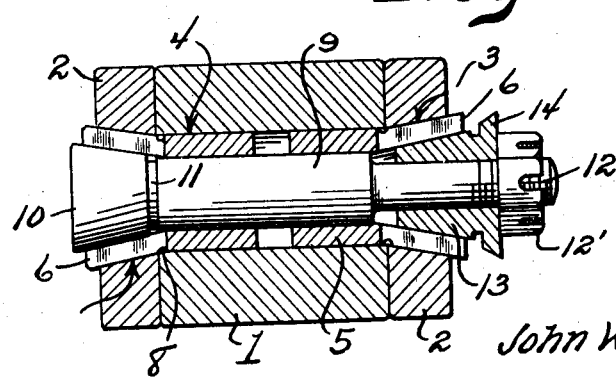
John W. Tewsley
INVENTOR
BY Victor J. Evans
ATTORNEY
WITNESS:

April 24, 1928.  1,667,610
J. W. TEWSLEY
WEAR COMPENSATING PIN
Filed April 12, 1927    2 Sheets-Sheet 2
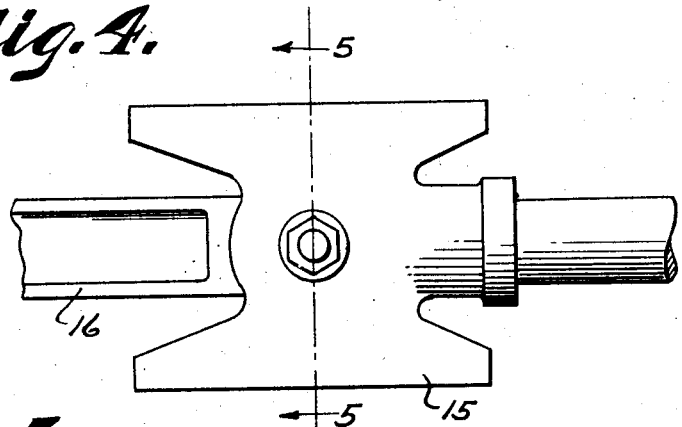
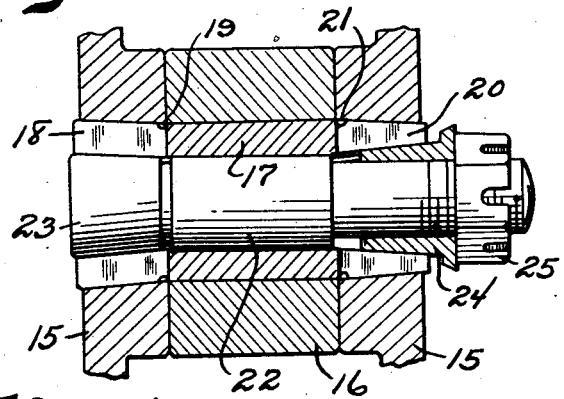
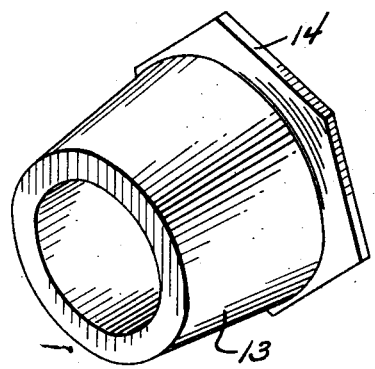
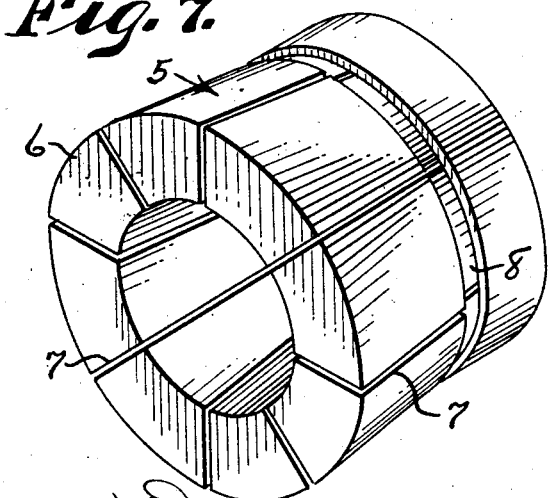
John W. Tewsley
INVENTOR
BY Victor J. Evans
ATTORNEY
WITNESS:

Patented Apr. 24, 1928.

1,667,610

UNITED STATES PATENT OFFICE.

JOHN W. TEWSLEY, OF WAVERLY, NEW YORK.

WEAR-COMPENSATING PIN.

Application filed April 12, 1927. Serial No. 183,158.

My present invention has reference to a wear compensating pivot pin for bearings of various types.

My object is the provision of a pin for this purpose that has an outwardly tapered head on one end thereof, which pin passes through a bushing or bushings having outwardly tapered and slitted ends, one of which being contacted by the head of the pin and the other being engaged by a tapered collar that is arranged on the second end of the pin but said collar being held in contact with the bore of the said tapered end through the medium of a nut that is screwed on the pin and whereby the adjustment of the nut will impart a longitudinal movement to the pin and collar and to expand the tapered ends of the bushing or bushings to compensate any wear which may occur between the said bushings and the bearing elements engaged thereby.

To the attainment of the above broadly stated objects and others which will present themselves as the nature of the invention is better understood, the improvement also resides in certain other novel features of construction, combination and operative arrangement of parts, a satisfactory embodiment of which is disclosed by the accompanying drawings.

In the drawings:

Figure 1 is a side elevation of valve links connected in accordance with this invention.

Figure 2 is an end view thereof, with parts in section.

Figure 3 is an enlarged sectional view approximately on the line 3—3 of Figure 2.

Figure 4 is a side elevation of a cross head provided with the improvement.

Figure 5 is a sectional view approximately on the line 5—5 of Figure 4.

Figure 6 is a perspective view of the tapered core.

Figure 7 is a similar view looking toward the tapered end of one of the bushings.

In the showing of Figures 1 to 3 of the drawings an arm 1 is pivotally connected to links 2. The links and the arm have aligning openings, the openings of the links being flared inwardly, as at 3, while the bearing openings 4 through the arm are of the same diameter throughout.

Received in the bearing openings 3 and 4 there are bushings 5. Both of these bushings are similarly constructed, each of the same having its outer end flared outwardly to form the same with a head 6, and these outwardly flared ends are slitted longitudinally, as at 7. The bushings at the juncture of the head therewith are formed with annular grooves 8 which permits of the flared ends of the said bushings being expanded. The body portions of the bushings are snugly received in the bearing openings 4.

Passing through the bushings there is a pin whose shank, for distinction, is indicated by the numeral 9. This pin has on one of its ends an outwardly flared head 10 that is received in the flared bore of the end 6 of one of the bushings 5. The shank, at its juncture with the head has an annular groove 11 therethrough and the shank has its second end formed with a reduced extension 12 which is threaded. Designed to be received on the threaded end 12 of the shank of the pin there is a tapered collar 13. This collar has an outer flat head portion 14 which is contacted by the nut 12. It will be apparent that by adjusting the nut on the pin, both the pin and the expansion collar 13 will be imparted a longitudinal movement, so that the tapered collar and the tapered head of the pin will enter the tapered ends of the bushings and expand the same. By this simple construction and arrangement of parts it will be noted that any wear between the bushings and the bearing openings in the arm and links may be readily compensated for. It will also be noted that there is a tight frictional engagement between the slitted ends of the bushings and the links so that the bushings are locked to the links and must turn therewith while the arm 1 is free to turn on the tubular bodies of the bushings.

In Figures 4 and 5 I have illustrated my improvement in connection with an engine cross head 15 and a pitman 16 which is pivoted thereto. In this instance, the sides of the cross head has oppositely flared openings therein which align with a round opening in the pitman. Received in these openings there is a bushing 17. One end of the bushing is flared outwardly, as at 18, and this flared end is slitted longitudinally. The bushing at its juncture with the flared end 18 has an annular groove 19 therethrough. The second end of the bushing has its bore flared outwardly and its periphery flared inwardly. This end of the bushing, indicated by the numeral 20, is slit longitudinally, the said slits terminating in an annular groove 21.

The pin 22 has an outwardly flared end 23 that is received in the bore of the end 18 of the bushing 17. The second end of the pin is reduced and threaded and receives thereon an inwardly flared expansion collar 24. The threaded end of the pin has screwed thereon a nut 25 which contacts with a headed and widened outer end of the expansion collar. The adjustment of the nut imparts a longitudinal movement to both the pin and to the collar so that the head 23 and the collar 24 will expand the flared and slitted end of the bushing 17 and thus compensate for any wear between the cross bushing, the cross head and the pitman. Also the expanded ends of the bushing will cause the bushing to be locked to the cross head.

Having described the invention, I claim:—

1. In a device for the purpose set forth, a pin having an outwardly tapered head at one end and its opposite end reduced and threaded, a bushing having outwardly tapered ends arranged on the pin and the bore of one end of the bushing receiving the head of the pin thereon, a tapered collar on the pin received in the second end of the bushing and a link screwed on the pin and contacting with the collar.

2. The combination with members designed to be pivotally connected and including outer members which contact with an inner member, all of said members having aligning round openings therethrough, the openings in the outer member being flared, of a bushing received in said openings and having flared and slitted ends for engaging the wall of the openings in the outer members and the body of the bushings snugly engaging the bore of the inner member, said bushing having annular grooves between the body and the said ends thereof, a pin received through the bushing and having an outwardly flared end to contact with the inner wall of one of the flared ends of the bushing and its opposite end reduced and threaded, an inwardly flared expansion collar on the said threaded end of the pin and received in the second end of the bushings and a nut screwed on the pin and contacting with the collar, for the purpose set forth.

In testimony whereof I affix my signature.

JOHN W. TEWSLEY.